(12) United States Patent
Choi et al.

(10) Patent No.: US 11,328,097 B2
(45) Date of Patent: May 10, 2022

(54) ENCRYPTION CIRCUIT FOR PERFORMING VIRTUAL ENCRYPTION OPERATIONS

(71) Applicant: Samsung Electronics Co., Ltd., Suwon-si (KR)

(72) Inventors: Hong-mook Choi, Bucheon-si (KR); Jae-hyeok Kim, Seoul (KR); Ji-su Kang, Seoul (KR); Hyun-il Kim, Seongnam-si (KR); Jong-hoon Shin, Hwaseong-si (KR); Hye-soo Lee, Yongin-si (KR)

(73) Assignee: Samsung Electronics Co., Ltd.

( * ) Notice: Subject to any disclaimer, the term of this patent is extended or adjusted under 35 U.S.C. 154(b) by 213 days.

(21) Appl. No.: 16/521,937

(22) Filed: Jul. 25, 2019

(65) Prior Publication Data

US 2020/0110906 A1     Apr. 9, 2020

(30) Foreign Application Priority Data

Oct. 5, 2018  (KR) .......................... 10-2018-0119306

(51) Int. Cl.
| | | |
|---|---|---|
| G06F 21/72 | (2013.01) | |
| H04L 9/06 | (2006.01) | |
| G06F 21/75 | (2013.01) | |
| H04L 9/00 | (2022.01) | |
| G06F 21/70 | (2013.01) | |
| G06F 21/71 | (2013.01) | |

(52) U.S. Cl.
CPC .............. *G06F 21/72* (2013.01); *G06F 21/70* (2013.01); *G06F 21/71* (2013.01); *G06F 21/75* (2013.01);
(Continued)

(58) Field of Classification Search
CPC .......... G06F 21/70; G06F 21/71; G06F 21/72; G06F 21/75; G06F 21/755; H04L 9/002;
(Continued)

(56) References Cited

U.S. PATENT DOCUMENTS 8,060,755 B2 * 11/2011 Henry ................. G06F 9/30007
380/37
8,879,727 B2    11/2014 Taylor et al.
(Continued)

FOREIGN PATENT DOCUMENTS

KR    10-2019-0014444    2/2019

OTHER PUBLICATIONS

Jain et al. "FPGA Implementation of Fully Pipelined AES with Compact S-Box" ASIO Journal of Engineering & Technological Perspective Research (ASIO-JETPR) 2(3):16-21 (May-Jun. 2016).
(Continued)

*Primary Examiner* — Kevin Bechtel
*Assistant Examiner* — D'Arcy Winston Straub
(74) *Attorney, Agent, or Firm* — Myers Bigel, P.A.

(57) ABSTRACT

An encryption circuit includes a pipelined encryption core having a plurality of round cores therein. The pipelined encryption core is configured to perform a real round operation on each of a plurality of pieces of input data received therein and generate encryption data from the input data using an encryption operation comprising the real round operation. An encryption controller is provided, which is coupled to the pipelined encryption core. The encryption controller is configured to control the pipelined encryption core so that at least one of the plurality of round cores performs a virtual round operation as part of the encryption operation. The pipelined encryption core is configured to perform a virtual encryption operation using at least one of: (i) dummy data, and (ii) a dummy encryption key.

17 Claims, 13 Drawing Sheets

(52) U.S. Cl.
CPC ............ *G06F 21/755* (2017.08); *H04L 9/002* (2013.01); *H04L 9/003* (2013.01); *H04L 9/06* (2013.01); *H04L 9/0618* (2013.01); *H04L 9/0631* (2013.01); *H04L 2209/08* (2013.01); *H04L 2209/125* (2013.01)

(58) Field of Classification Search
CPC ......... H04L 9/003; H04L 9/06; H04L 9/0618; H04L 9/0631; H04L 2209/08; H04L 2209/12; H04L 2209/125
See application file for complete search history.

(56) References Cited

U.S. PATENT DOCUMENTS

| | | | |
|---|---|---|---|
| 9,614,666 | B2 | 4/2017 | Kishinevsky et al. |
| 9,712,319 | B2 | 7/2017 | Avanzi |
| 2010/0250964 | A1 | 9/2010 | Olson et al. |
| 2014/0003602 | A1 | 1/2014 | Gueron et al. |
| 2016/0012212 | A1 | 1/2016 | Moritz et al. |
| 2016/0127123 | A1* | 5/2016 | Johnson .................. H04L 9/003 713/189 |
| 2017/0288855 | A1 | 10/2017 | Kumar et al. |
| 2019/0116022 | A1 | 4/2019 | Kim et al. |
| 2019/0268137 | A1* | 8/2019 | Linge ..................... H04L 9/003 |

OTHER PUBLICATIONS

Lee et al. "Top-down Implementation of Pipelined AES Cipher and its Verification with FPGA-based Simulation Accelerator" 2005 6th International Conference on ASIC (Oct. 24-27, 2005).

Soltani et al. "An ultra-high throughput and fully pipelined implementation of AES algorithm on FPGA" Microprocessors and Microsystems 39:480-493 (2015).

* cited by examiner

ENCRYPTION CIRCUIT FOR PERFORMING VIRTUAL ENCRYPTION OPERATIONS

REFERENCE TO PRIORITY APPLICATION

This application claims the benefit of Korean Patent Application No. 10-2018-0119306, filed Oct. 5, 2018, the disclosure of which is hereby incorporated herein by reference.

BACKGROUND

The inventive concept relates to an encryption circuit for performing an encryption operation and an operating method thereof and, more particularly, to an encryption circuit for performing virtual encryption operations and methods of performing virtual encryption.

Smart cards and integrated circuit (IC) cards include security information about a user. An encryption circuit, which generates and transmits a ciphertext of security information transmitted through a signature or authentication process, is needed for preventing security information about a user from being leaked due to hacking or the like.

An attacker may conduct a side-channel analysis attack instead of directly manipulating input or output data. In the side-channel analysis attack, the attacker may collect pieces of subsidiary information such as the amount of power consumed by an encryption circuit and a waveform of an electromagnetic wave generated by the encryption circuit. The attacker may attack the encryption circuit so as to detect a key used in the encryption circuit, based on the collected pieces of subsidiary information. Therefore, a side-channel analysis attack preventing method may use a method which randomly or uniformly shows power and an electromagnetic wave each included in information collected through a side-channel.

SUMMARY

The inventive concept provides an encryption circuit for performing a real encryption operation and a virtual encryption operation on data and an operating method thereof.

According to an aspect of the inventive concept, there is provided an encryption circuit including a pipelined encryption core, which contains a plurality of round cores configured to perform a real round operation on each of a plurality of pieces of input data sequentially input thereto. The pipelined encryption core outputs encryption data through an encryption operation using the real round operation. An encryption controller is provided, which is configured to perform control so that at least one of the plurality of round cores performs a virtual round operation additionally. The encryption controller may be configured to perform control so that the virtual round operation of the at least one round core is performed in parallel with the real round operation of at least one other round core of the plurality of round cores.

According to another aspect of the inventive concept, there is provided an encryption circuit including a first round core configured to perform a first real round operation on input data, a second round core configured to perform a second real round operation on the input data, based on a result of the first real round operation, and a key scheduler configured to provide a round key (i.e., encryption key) to each of the first round core and the second round core. The first round core may be configured to further perform a first virtual round operation, based on one of dummy data and a first virtual round key provided from the key scheduler, and the first virtual round operation of the first round core may be performed in parallel with the second real round operation.

According to another aspect of the inventive concept, there is provided an encryption circuit including a first round core configured to perform a first real round operation on input data, a second round core configured to perform a second real round operation on the input data, based on a result of the first real round operation, and a key scheduler. The key scheduler is configured to provide a round key to each of the first round core and the second round core. The second round core may be configured to further perform a virtual round operation, based on one of dummy data and a virtual round key provided from the key scheduler, and the first real round operation may be performed in parallel with the virtual round operation of the second round core.

According to another embodiment of the inventive concept, an encryption circuit is provided with a pipelined encryption core having a plurality of round cores (i.e., encryption cores) therein. The pipelined encryption core is configured to: (i) perform a real round operation on each of a plurality of pieces of input data received therein, and (ii) generate encryption data from the input data using an encryption operation including the real round operation. An encryption controller is also provided, which is coupled to the pipelined encryption core. The encryption controller is configured to control the pipelined encryption core so that at least one of the plurality of round cores performs a virtual round operation as part of the encryption operation. In some of these embodiments of the invention, the virtual round operation may be performed in a first one of the plurality of round cores, and a real round operation may be performed in a second one of the plurality of round cores concurrently with the virtual round operation. The pipelined encryption core may be configured to perform a virtual encryption operation using at least one of: (i) dummy data, and (ii) a dummy encryption key. In further embodiments of the invention, the pipelined encryption core may include a pipelined arrangement of round cores, which are separated from each other in the pipelined arrangement by respective registers. The pipelined encryption core may also include a key scheduler, which is configured to generate real and virtual keys. These keys are used by the plurality of round cores when performing real and virtual encryption operations.

According to additional embodiments of the invention, an encryption circuit is provided with an encryption core. This encryption core is configured to perform a real encryption operation on at least a portion of a stream of input data using at least one real encryption key. This real encryption operation is performed concurrently with generating virtual encryption noise by performing a virtual encryption operation on virtual data using a virtual encryption key. The encryption core may include a pipelined encryption core having a pipelined arrangement of round cores (e.g., encryption cores) therein. And, during the real encryption operation, a first of the round cores in the pipelined encryption core may encrypt first input data using a first real encryption key. In addition, during the virtual encryption operation, a second of the round cores in the pipelined encryption core may encrypt first virtual data using a first virtual encryption key. The encryption of the first input data and the encryption of the first virtual data may occur in parallel within the pipelined encryption core, to thereby facilitate the advantageous generation of virtual encryption noise. This virtual encryption noise may operate to prevent successful side-channel analysis attacks. A key scheduler may also be provided, which is configured to generate the first real encryption key and the first virtual encryption key at respective outputs thereof, which are electrically coupled to the first of the round cores and the second of the round cores.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

Hereinafter, embodiments will be described in detail with reference to the accompanying drawings.

Figure 1:
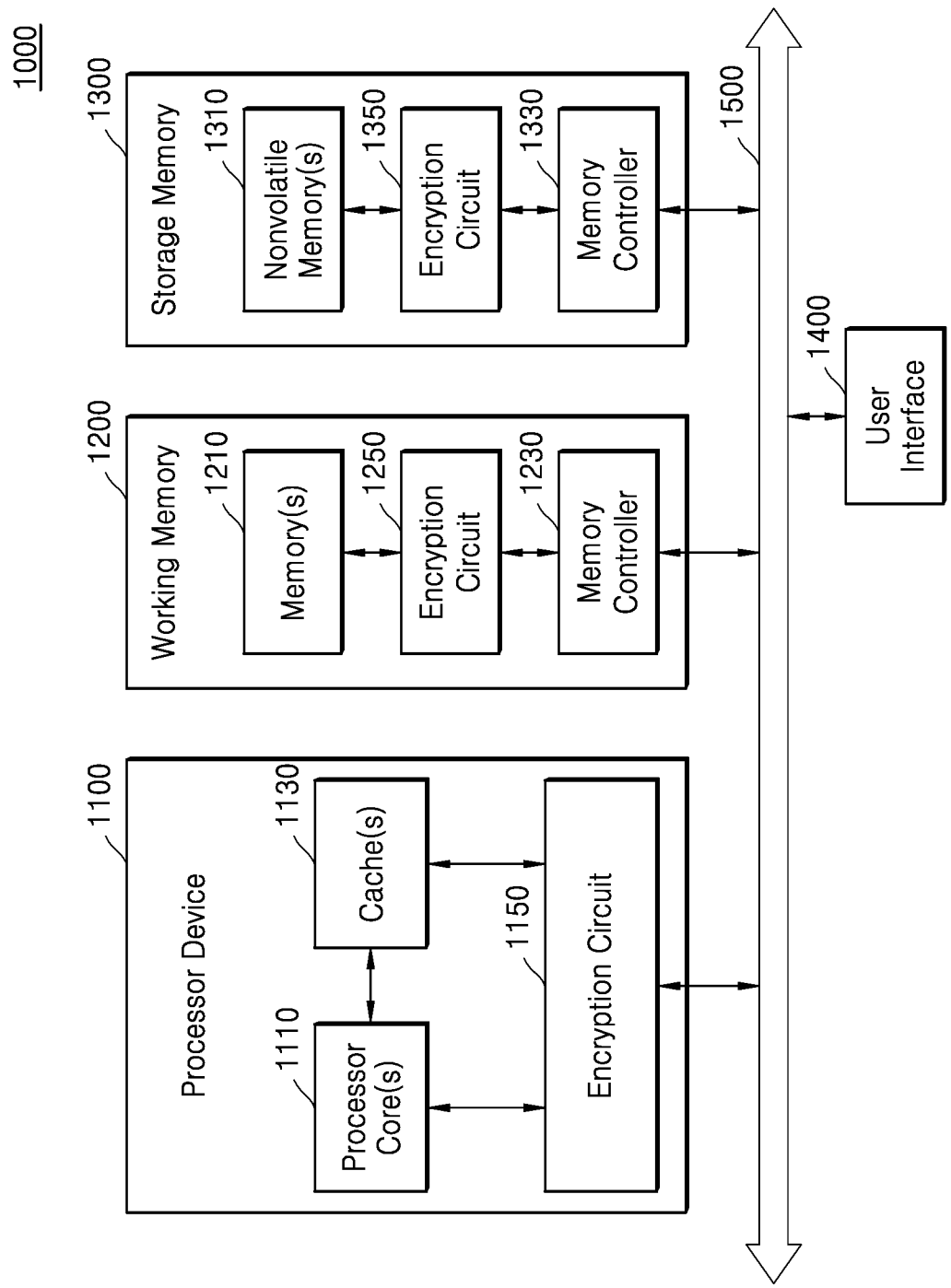
FIG. 1 is a block diagram illustrating a computing device according to an embodiment.

FIG. 1 is a block diagram illustrating a computing device 1000 according to an embodiment. FIG. 1 is a block diagram illustrating the computing device 1000, which includes electronic devices and encryption circuits according to an embodiment. In an embodiment, the computing device 1000 may include a processor device 1100, a working memory 1200, a storage memory 1300, a user interface 1400, and a bus 1500.

For example, the computing device 1000 may be one of various electronic devices such as a desktop computer, a laptop computer, a tablet computer, a workstation, a server, a digital television (TV), a video game console, a smartphone, and a wearable device, but the present embodiment is not limited thereto.

The processor device 1100 may control overall operations of the computing device 1000. The processor device 1100 may be configured to perform various kinds of arithmetic operations and/or logical operations. To this end, the processor device 1100 may be implemented with a special-purpose logic circuit, such as, for example, a field programmable gate array (FPGA), an application specific integrated circuit (ASICs), or a similar type circuit including one or more processor cores 1110. In an embodiment, the processor device 1100 may include a general-purpose processor, a special-purpose processor, and/or an application processor.

In some embodiments, the processor device 1100 may execute an instruction set including program code by using the processor cores 1110. One or more caches 1130 may temporarily store data which is to be used for executing the instruction set or data generated by executing the instruction set.

The processor device 1100 may encrypt data output from each of the processor cores 1110 and/or the caches 1130 by using an encryption circuit 1150. Furthermore, by using the encryption circuit 1150, the processor device 1100 may decrypt data which is to be input to the processor cores 1110 and/or the caches 1130.

The working memory 1200 may temporarily store data used for an operation of the computing device 1000. For example, the working memory 1200 may store data, which is obtained through processing by the processor device 1100 or is to be processed by the processor device 1100, in one or more memories 1210. In some embodiments, the memories 1210 may include a volatile memory such as static random access memory (SRAM), dynamic random access memory (DRAM), or synchronous dynamic random access memory (SDRAM). The memory controller 1230 may control the memories 1210 in order for the memories 1210 to store data or output the stored data.

The working memory 1200 may encrypt, by using an encryption circuit 1250, data which is to be stored in each of the memories 1210. Also, by using the encryption circuit 1250, the working memory 1200 may decrypt data output from each of the memories 1210. The storage memory 1300 may store data regardless of the supply of power. The storage memory 1300 may store system data used for operating the computing device 1000 and/or user data, used for a user of the computing device 1000, in one or more non-volatile memories 1310. For example, the non-volatile memories 1310 may include at least one of non-volatile memories such as flash memory, phase-change random access memory (PRAM), magneto-resistive random access memory (MRAM), resistive random access memory (ReRAM), and ferroelectric random access memory (FRAM). The memory controller 1330 may control the non-volatile memories 1310 in order for the non-volatile memories 1310 to store data or output the stored data. For example, the storage memory 1300 may include a storage medium such as solid state drive (SSD), hard disk drive (HDD), secure digital (SD) card, or multimedia card (MMC).

The storage memory 1300 may encrypt, by using an encryption circuit 1350, data which is to be stored in each of the non-volatile memories 1310. Also, the storage memory 1300 may decrypt data output from each of the non-volatile memories 1310 by using the encryption circuit 1350.

The user interface 1400 may interface communication between a user and the computing device 1000 according to control by the processor device 1100. For example, the user interface 1400 may process an input received through a keyboard, a mouse, a keypad, a button, a touch panel, a touch screen, a touch pad, a touch ball, or a microphone, or may process an input from a camera, a gyroscope sensor, or a vibration sensor. Also, the user interface 1400 may process an output which is to be provided to a display apparatus, a speaker, or a monitor.

The bus 1500 may provide a communication path between the elements of the computing device 1000. The elements of the computing device 1000 may exchange data, based on a bus format. For example, the bus format may include one or more of various communication protocols such as peripheral component interconnection (PCI), PCI express (PIC-E), non-volatile memory express (NVMe), small computer system interface (SCSI), advanced technology attachment (ATA), serial-ATA (SATA), parallel-ATA (PATA), serial attached SCSI (SAS), and universal serial bus (USB).

The encryption circuits 1150, 1250, and 1350 may convert data into encryption data through an encryption operation. In this case, the encryption operation may include a process of sequentially performing a plurality of round operations. For example, the encryption operation may include an initial encryption operation and first to $n^{th}$ round operations, and a next round operation may be performed based on a previous round operation result.

The encryption circuits 1150, 1250, and 1350 may each be configured so that, by additionally performing a virtual round operation preceding or succeeding a real round operation performed on data, it is considerably more difficult to detect a time when the real round operation is performed. Also, the encryption circuits 1150, 1250, and 1350 may each be configured so that, in a case where the real round operation is performed on data, another circuit (for example, another round core) performs the virtual round operation concurrently (e.g., simultaneously), and thus, there is noise in information collected through a side-channel by a potential attacker. Accordingly, a security level of each of the encryption circuits 1150, 1250, and 1350 may be enhanced.

FIG. 1 illustrates an example where the encryption circuits 1150, 1250, and 1350 are respectively included in data input/output (I/O) devices, that is, the processor device 1100, the working memory 1200, and the storage memory 1300. However, in an embodiment, the encryption circuits 1150, 1250, and 1350 may be implemented as encryption devices independent of the data I/O devices, that is, the processor device 1100, the working memory 1200, and the storage memory 1300. Also, the bus 1500 and devices (for example, the user interface 1400) other than the data I/O devices, that is, the processor device 1100, the working memory 1200, and the storage memory 1300, may each include an encryption circuit. The encryption circuit may be applied to an arbitrary path through which data is input or output. Exemplary configurations and operations of the encryption circuits 1150, 1250, and 1350 will be described below with reference to the following drawings.

Figure 2:
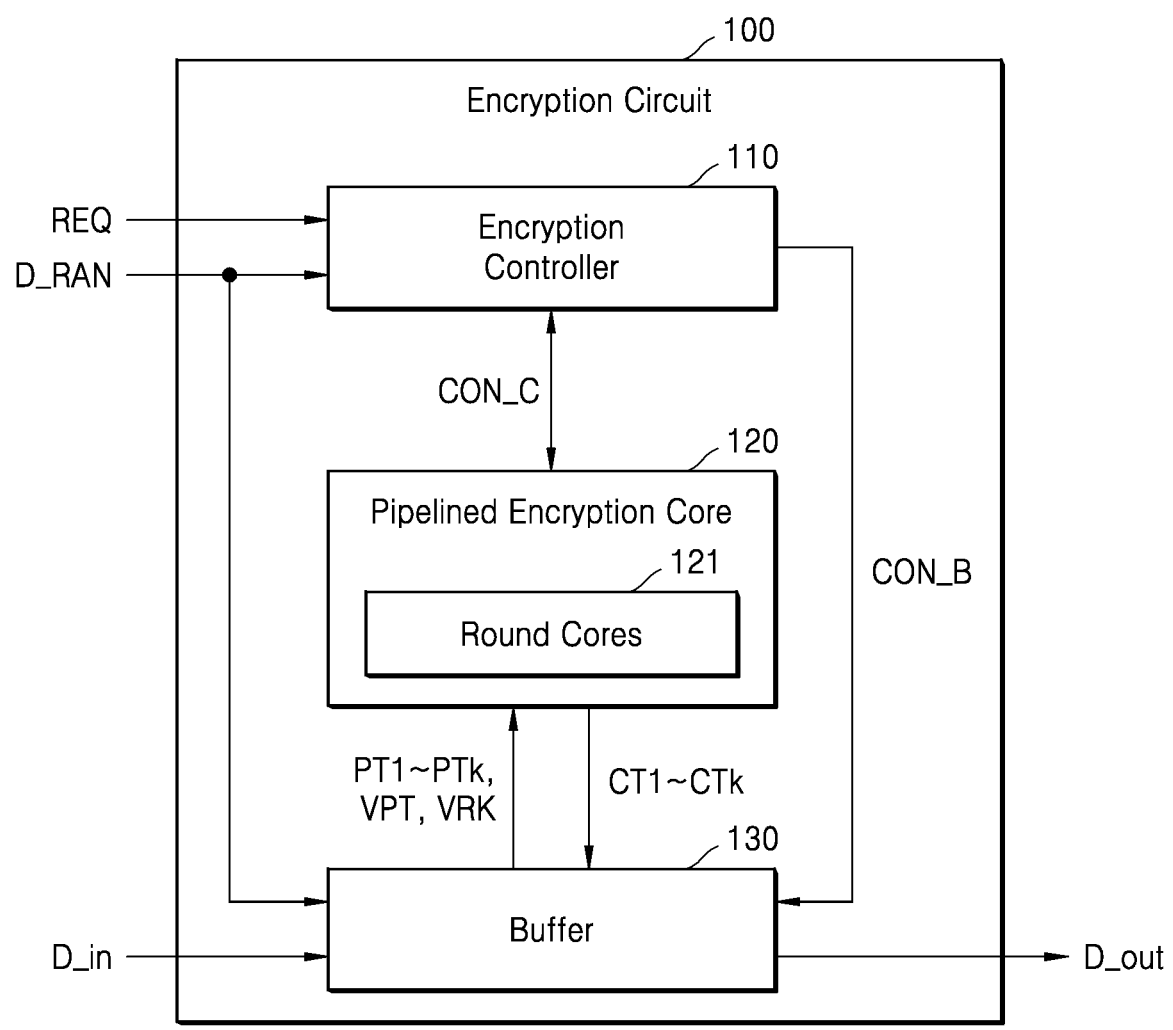
FIG. 2 is a block diagram illustrating an encryption circuit according to an embodiment.

FIG. 2 is a block diagram illustrating an encryption circuit 100 according to an embodiment. The block diagram of the encryption circuit 100 of FIG. 2 may be, for example, a detailed block diagram of each of the encryption circuits 1150, 1250, and 1350 of FIG. 1. In the drawing, an encryption operation will be described, and the same description may be applied to a decryption operation.

Referring to FIG. 2, the encryption circuit 100 may include an encryption controller 110, a pipelined encryption core 120, and a buffer 130. The encryption controller 110 may control an overall operation of the encryption circuit 100 in response to a request REQ. A control value indicating an environment and performing of an encryption operation may be stored in the encryption controller 110. The encryption controller 110 may respectively transmit control signals CON_C and CON_B to the pipelined encryption core 120 and the buffer 130, for controlling operations of the pipelined encryption core 120 and the buffer 130.

The encryption controller 110 may control a plurality of round cores 121 included in the pipelined encryption core 120 so as to perform a virtual encryption operation, based on the control signal CON_C. In an embodiment, the encryption controller 110 may determine the number of virtual encryption operations which are to be performed by each of the plurality of round cores 121 before performing a real encryption operation or the number of virtual encryption operations which are to be performed by each of the plurality of round cores 121 after performing a real encryption operation, based on random data D_RAN input from the outside. Alternatively, in a case where one of the plurality of round cores 121 performs a real round operation, the encryption controller 110 may control the pipelined encryption core 120 in order for another round core to perform a virtual round operation. An example where the encryption controller 110 receives the random data D_RAN from the outside is illustrated in the drawing, but the present embodiment is not limited thereto. In other embodiments, the encryption controller 110 may internally generate the random data D_RAN.

The pipelined encryption core 120 may sequentially receive first to $k^{th}$ real data PT1 to PTk, corresponding to units by which an arithmetic operation is performed, from the buffer 130. The pipelined encryption core 120 may perform a real encryption operation on the first to $k^{th}$ real data PT1 to PTk (using a real encryption key(s) RK (e.g., RK0 to RKn)) to output first to $k^{th}$ encryption data CT1 to CTk. The pipelined encryption core 120 may update the buffer 130 with the first to $k^{th}$ encryption data CT1 to CTk on which the real encryption operation has been performed. In this case, k may be a natural number equal to or more than three, but is not limited thereto. In other embodiments, the pipelined encryption core 120 may sequentially receive one or more pieces of real data.

The pipelined encryption core 120 may perform the real encryption operation through a permutation operation of mixing bit positions of the first to $k^{th}$ real data PT1 to PTk, based on a real encryption key. Alternatively, the pipelined encryption core 120 may perform an encryption operation through a substitution operation of changing each of the first to $k^{th}$ real data PT1 to PTk to other data mapped thereto, based on the encryption key.

The pipelined encryption core 120 may receive dummy data VPT or a dummy encryption key VRK from the buffer 130. The pipelined encryption core 120 may perform a virtual encryption operation using the dummy data VPT or the dummy encryption key VRK. For example, the pipelined encryption core 120 may perform a virtual encryption operation using the dummy data VPT and the dummy encryption key VRK, a virtual encryption operation using the dummy data VPT and the real encryption key, or a virtual encryption operation using the first to $k^{th}$ real data PT1 to PTk and the dummy encryption key VRK.

In an embodiment, the pipelined encryption core 120 may include the plurality of round cores 121 for each performing a round operation. The real encryption operation performed by the pipelined encryption core 120 may include real round operations respectively performed by the round cores 121. Also, the virtual encryption operation performed by the pipelined encryption core 120 may include virtual round operations respectively performed by the round cores 121. The round operation performed by the pipelined encryption core 120 may be classified as one of a real round operation and a virtual round operation, based on the kind of an encryption key and input data D_in.

The pipelined encryption core 120 may perform, in parallel, encryption operations on the first to $k^{th}$ real data PT1 to PTk. For example, at least two of the plurality of round cores 121 may perform, in parallel, ones of real round operations and virtual round operations.

In an embodiment, in response to the control signal CON_C provided from the encryption controller 110, the pipelined encryption core 120 may perform an initial virtual round operation at least once before an initial round core for performing an initial round operation performs an initial real round operation. Alternatively, in response to the control signal CON_C provided from the encryption controller 110, the pipelined encryption core 120 may perform an initial virtual round operation at least once after the initial round core performs an initial real round operation. Accordingly, in the encryption circuit 100 according to the present embodiment, a potential attacker may find it difficult to detect a time when a real encryption operation is performed, thereby enhancing a security level of the encryption circuit 100. A round operation of the pipelined encryption core 120 will be described below in detail with reference to FIG. 6.

In an embodiment, in response to the control signal CON_C provided from the encryption controller 110, a first round core of the pipelined encryption core 120 may perform a first virtual round operation while the initial round core is performing the initial real round operation. Accordingly, since a real encryption operation is performed along with a virtual encryption operation, noise may occur, thereby enhancing a security level of the encryption circuit 100. A round operation of the pipelined encryption core 120 will be described below in detail with reference to FIG. 10.

The buffer 130 may temporarily store the input data D_in provided from the outside. That is, the buffer 130 may store data on which a real operation for encryption is to be performed. At this time, in response to the control signal CON_B provided from the encryption controller 110, the buffer 130 may divide the input data D_in by units of encryption operations performed and may provide divided input data to the pipelined encryption core 120. For example, the buffer 130 may sequentially provide the first to $k^{th}$ real data PT1 to PTk to the pipelined encryption core 120.

Moreover, the buffer 130 may temporarily store the random data D_RAN provided from the outside. In response to the control signal CON_B provided from the encryption controller 110, at least a portion of the random data D_RAN stored in the buffer 130 may be provided to the pipelined encryption core 120. For example, the buffer 130 may provide the pipelined encryption core 120 with at least a portion of the random data D_RAN as the dummy data VPT for a virtual round operation. Alternatively, for example, the buffer 130 may provide the pipelined encryption core 120 with at least a portion of the random data D_RAN as the dummy encryption key VRK for the virtual round operation.

The buffer 130 may receive the first to $k^{th}$ encryption data CT1 to CTk from the pipelined encryption core 120. The buffer 130 may output each of the first to $k^{th}$ encryption data CT1 to CTk as output data D_out. Accordingly, the output data D_out may be generated by encrypting the input data D_in.

Figure 3:
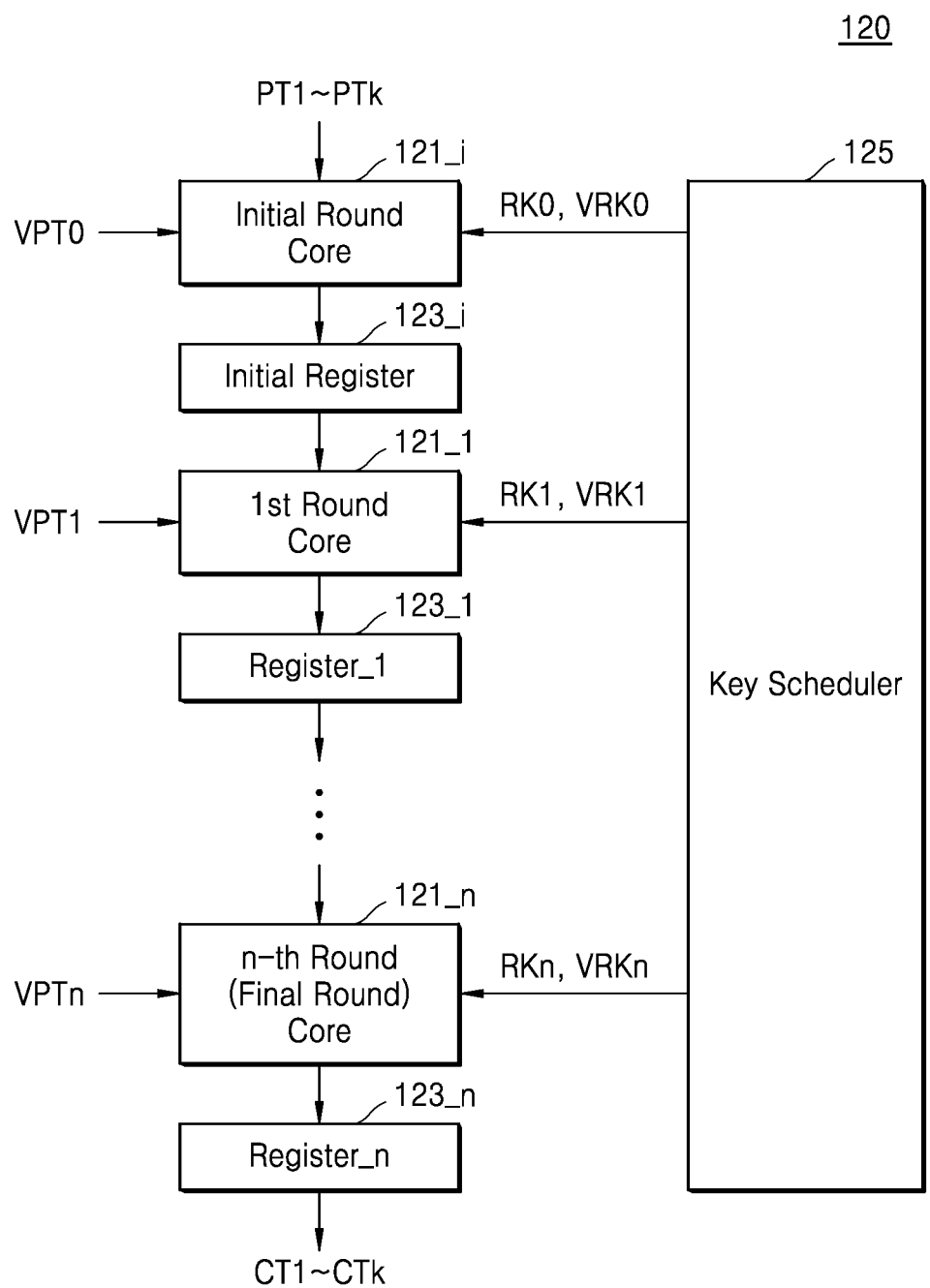
FIG. 3 is a block diagram illustrating a pipelined encryption core included in an encryption circuit according to an embodiment.

FIG. 3 is a block diagram illustrating a pipelined encryption core 120 included in an encryption circuit according to an embodiment. In the drawing, an encryption operation will be described, and the same description may be applied to a decryption operation. Referring to FIG. 3, the pipelined encryption core 120 may include an initial round core 121_i, first to $n^{th}$ round cores 121_1 to 121_n, an initial register 123_i, first to $n^{th}$ registers 123_1 to 123_n, and a key scheduler 125. For example, the initial round core 121_i and the first to $n^{th}$ round cores 121_1 to 121_n may be the plurality of round cores 121 of FIG. 2. In this case, n may be a natural number equal to or more than three, but the present embodiment is not limited thereto. The number of round cores included in the pipelined encryption core 120 may be variously set to one or more. In an embodiment, the pipelined encryption core 120 may include only the first to $n^{th}$ round cores 121_1 to 121_n without including the initial round core 121_i.

An encryption operation performed by the pipelined encryption core 120 may include a plurality of round operations, for increasing a security level thereof, and the round operations may be performed by different round cores. For example, the initial round core 121_i may perform an initial round operation, the first round core 121_1 may perform a first round operation, and the $n^{th}$ round core 121_n may perform an $n^{th}$ round operation.

Each of the plurality of round operations may include a real round operation and a virtual round operation. For example, the initial round operation may include an initial real round operation and an initial virtual round operation, the first round operation may include a first real round operation and a first virtual round operation, and the $n^{th}$ round operation may include an $n^{th}$ real round operation and an $n^{th}$ virtual round operation.

The initial round core 121_i and the first to $n^{th}$ round cores 121_1 to 121_n may perform an initial encryption operation and first to $n^{th}$ real encryption operations using real data (for example, PT1 to PTk) and a real encryption key (for example, RK0 to RKn). For example, the initial round core 121_i may perform an initial real encryption operation using first to $k^{th}$ real data PT1 to PTk and an initial real encryption key RK0. In this case, initial real encryption keys RK0 respectively corresponding to the first to $k^{th}$ real data PT1 to PTk may differ or may be the same. A description of the initial real encryption operation performed by the initial round core 121_i may be applied to the first to $n^{th}$ real encryption operations respectively performed by the first to $n^{th}$ round cores 121_1 to 121_n.

The first to $k^{th}$ real data PT1 to PTk may be input to the initial round core 121_i. For example, when the first real data PT1 is input to the initial round core 121_i, the initial round core 121_i may perform an initial real round operation on the first real data PT1, and a performing result may be stored in the initial register 123_i. The performing result may be again provided to the first round core 121_1, and the first round core 121_1 may perform a first real round operation on the first real data PT1. A result obtained by performing the first real round operation on the first real data PT1 may be stored in the first register 123_1. That is, the first real data PT1 may be encrypted as first encryption data CT1 through a real round operation performed a total of (n+1) times and may be output from the pipelined encryption core 120. A description of the real encryption operation performed on the first real data PT1 may be applied to real encryption operations respectively performed on the second to $k^{th}$ real data PT2 to PTk.

The first to $k^{th}$ real data PT1 to PTk may be sequentially input to the initial round core 121_i. The pipelined encryption core 120 may perform, in parallel, encryption operations on the first to $k^{th}$ real data PT1 to PTk sequentially input thereto. That is, the pipelined encryption core 120 may perform the encryption operations on the first to $k^{th}$ real data PT1 to PTk by using a pipeline manner. For example, while the first round core 121_1 is performing the first round operation on the first real data PT1, the initial round core 121_i may perform the initial round operation on the second real data PT2. While the second round core 121_2 is performing the second round operation on the first real data PT1, the first round core 121_1 may perform the first round operation on the second real data PT2 and the initial round core 121_i may perform a round operation on the third real data PT3.

Each of the initial round core 121_i and the first to n$^{th}$ round cores 121_1 to 121_n may perform a virtual encryption operation using pieces of dummy data VPT0 to VPTn or virtual encryption keys VRK0 to VRKn. For example, at least one of initial dummy data VPT0 and an initial virtual encryption key VRK0 may be provided to the initial round core 121_i. For example, the initial round core 121_i may perform a virtual encryption operation using the initial dummy data VPT0 and the initial virtual encryption key VRK0, perform a virtual encryption operation using the initial dummy data VPT0 and the initial real encryption key RK0, or perform a virtual encryption operation using the first to k$^{th}$ real data PT1 to PTk and the initial virtual encryption key VRK0. A description of the initial virtual encryption operation performed by the initial round core 121_i may be applied to the first to n$^{th}$ virtual encryption operations respectively performed by the first to n$^{th}$ round cores 121_1 to 121_n.

In an embodiment, the initial register 123_i may include an initial real register and an initial virtual register. A result of an initial virtual round operation performed by the initial round core 121_i may be stored in the initial virtual register and may be provided to the first round core 121_1, which is a next round core. The first round core 121_1 may also receive the result to perform the first virtual round operation. Alternatively, in an embodiment, the result of the initial virtual round operation performed by the initial round core 121_i may be stored in the initial virtual register, but may not be provided to the first round core 121_1. A description of the initial virtual encryption operation performed by the initial round core 121_i may be applied to the first to n−1$^{th}$ virtual encryption operations respectively performed by the first to n−1$^{th}$ round cores 121_1 to 121_n−1.

The key scheduler 125 may manage encryption keys used for encryption operations in response to control by an encryption controller (for example, 110 of FIG. 2). For example, the key scheduler 125 may manage the real encryption keys RK0 to RKn used for real encryption operations to provide the initial round core 121_i and the first to n$^{th}$ round cores 121_1 to 121_n with the real encryption keys RK0 to RKn, which are to be used for real round operations. Also, the key scheduler 125 may manage the virtual encryption keys VRK0 to VRKn used for virtual encryption operations in response to control by the encryption controller 110. The key scheduler 125 may include a memory for storing the real encryption keys RK0 to RKn and the virtual encryption keys VRK0 to VRKn, or may access encryption keys stored in another memory.

In the drawing, dummy data (for example, VPT0 to VPTn) is illustrated as being provided to each of the initial round core 121_i and the first to n$^{th}$ round cores 121_1 to 121_n, but the present embodiment is not limited thereto. In the pipelined encryption core 120 according to the present embodiment, the dummy data may be provided to at least one of the initial round core 121_i and the first to n$^{th}$ round cores 121_1 to 121_n. Also, in the drawing, a virtual encryption key (for example, VRK0 to VRKn) is illustrated as being provided to each of the initial round core 121_i and the first to n$^{th}$ round cores 121_1 to 121_n, but the present embodiment is not limited thereto. In other embodiments, the virtual encryption key may be provided to at least one of the initial round core 121_i and the first to n$^{th}$ round cores 121_1 to 121_n. Therefore, the pipelined encryption core 120 according to the present embodiment may be configured so that at least one of the initial round core 121_i and the first to n$^{th}$ round cores 121_1 to 121_n performs a virtual round operation according to control by the encryption controller 110.

Figure 4:
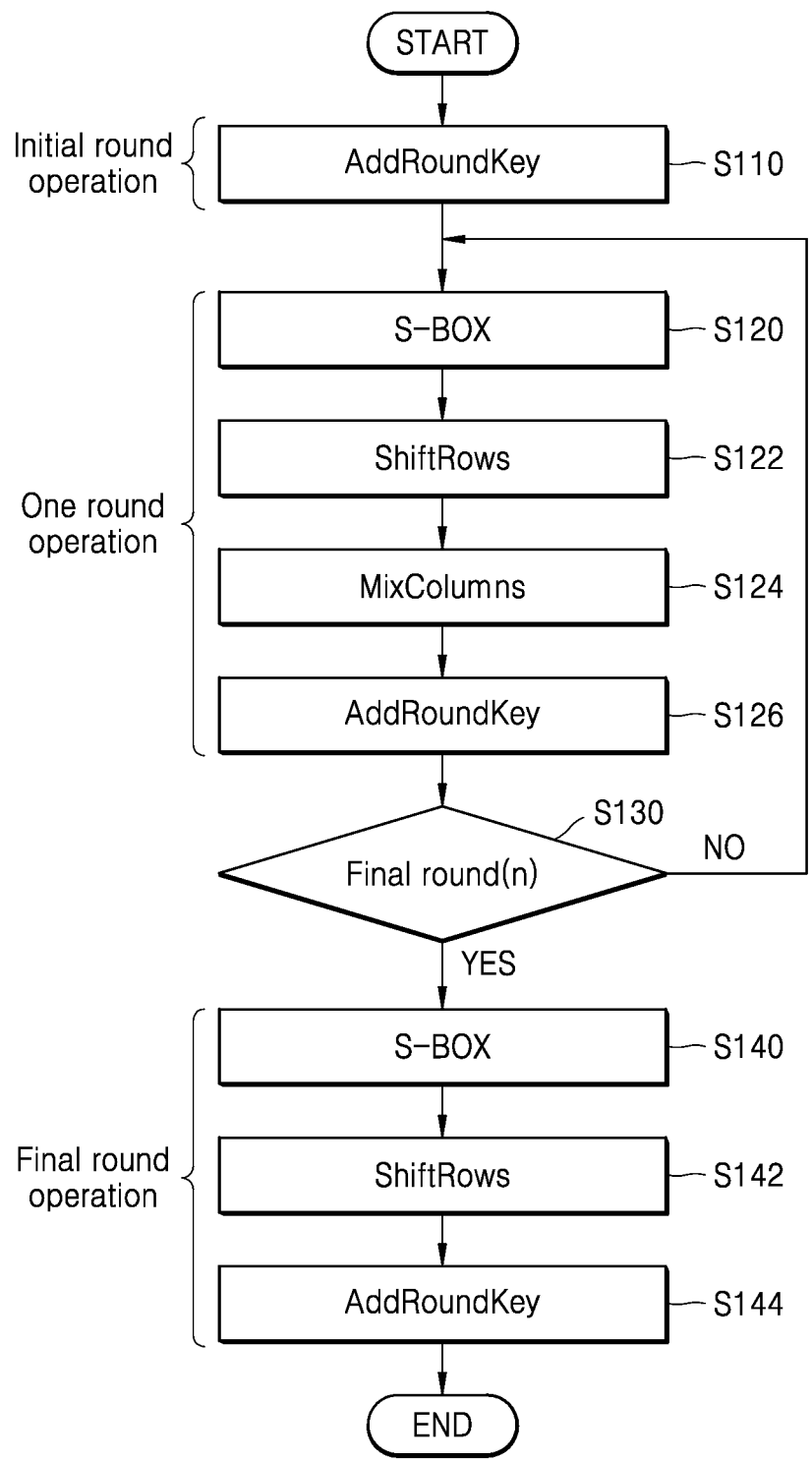
FIG. 4 is a flowchart of an encryption operation performed by an encryption circuit according to an embodiment.

FIG. 4 is a flowchart for describing an encryption operation performed by an encryption circuit according to an embodiment and is a diagram for describing a real encryption operation. For example, FIG. 4 may describe an example where the pipelined encryption core 120 of FIG. 3 performs an encryption operation according to advanced encryption standard (AES) established by the U.S. National Institute of Standards and Technology (NIST). However, FIG. 4 may be provided for ease of understanding, and the present embodiment is not limited thereto. An encryption operation may be performed by the pipelined encryption core 120 according to control by an encryption controller (for example, 110 of FIG. 2).

Referring to FIGS. 3 and 4, in operation S110, the initial round core 121_i may perform an "AddRoundKey" operation. The "AddRoundKey" operation may include an operation of performing a bitwise combination logic operation (for example, an OR operation, an AND operation, an XOR operation, or the like) on real data (for example, the first to k$^{th}$ real data PT1 to PTk) and the initial real round key RK0. Accordingly, each of the first to k$^{th}$ real data PT1 to PTk may be converted into other data, based on a selected initial real round key RK0. In an embodiment, the "AddRoundKey" operation may be implemented as an XOR operation.

In operation S120, the first round core 121_1 may perform a substitution operation on data obtained through conversion by the initial round core 121_i. In operation S122, the first round core 121_1 may perform a "ShiftRows" operation on a state of data which is obtained through the substitution operation performed in operation S120. In the "ShiftRows" operation, rows of a data state may be cyclically shifted. In operation S124, the first round core 121_1 may perform a "MixColumns" operation on a data state which is obtained through the "ShiftRows" operation performed in operation S122. In the "MixColumns" operation, columns of the data state may be mixed.

Subsequently, in operation S126, the first round core 121_1 may perform an "AddRoundKey" operation on converted data having a state which is obtained through the "MixColumns" operation performed in operation S124. The first round core 121_1 may perform a bitwise combination logic operation on the converted data and the first real round key RK1.

In operation S130, an encryption controller (for example, 110 of FIG. 2) may determine whether a next round operation is a final round operation. The encryption controller 110 may manage the number of real round operations. When it is determined that the next round operation is not the final round operation, operation S120 may be performed again. For example, in operation S120, the second round core 121_2 may perform a substitution operation on data which is obtained through conversion performed in operation S126. On the other hand, when it is determined that the next round operation is the final round operation, operation S140 may be performed.

Operations S120 to S126 may configure one real round operation (i.e., each of the first to n−1$^{th}$ real round operations). The key scheduler 125 may select different real round keys RK1 to RKn−1 from among the real encryption keys RK0 to RKn for each of the first to n−1$^{th}$ round cores 121_1 to 121_n−1, for the "AddRoundKey" operation performed in operation S126.

In operation S140, the n$^{th}$ round core 121_n may perform a substitution operation on data which is obtained through conversion performed in operation S126. In operation S142, the $n^{th}$ round core 121_$n$ may perform a "ShiftRows" operation on a state of data which is obtained through the substitution operation performed in operation S140. In operation S144, the $n^{th}$ round core 121_$n$ may perform an "AddRoundKey" operation on data having a state which is obtained through the "ShiftRows" operation performed in operation S142. For example, a final real round operation (an $n^{th}$ real round operation) may be completed, and then, encryption data (for example, the first to $k^{th}$ encryption data CT1 to CTk) may be output.

As the initial real round operation and the first to $n^{th}$ real round operations are sequentially performed, a value of data may progressively vary. The final round operation including operations S140 to S144 may be completed, and then, finally converted data may be output as the encryption data CT1 to CTk, and thus, an attacker may be difficult to arbitrarily manipulate or damage the encryption data CT1 to CTk.

In the drawing, an example the initial real round operation and the first to $n^{th}$ real round operations are respectively performed by the initial round core 121_$i$ and the first to $n^{th}$ round cores 121_1 to 121_$n$ is illustrated, but may be applied to a virtual round operation. For example, at least one of the initial dummy data VPT0 and the initial virtual encryption key VRK0 may be provided to the initial round core 121_$i$, and operation S110 may be performed by using at least one of the initial dummy data VPT0 and the initial virtual encryption key VRK0, thereby performing an initial virtual round operation. Also, at least one of the first dummy data VPT1 and the first virtual encryption key VRK1 may be provided to the first round core 121_1, and the first round core 121_1 may perform operations S120 to S126 by using at least one of the first dummy data VPT1 and the first virtual encryption key VRK1 to perform the first virtual round operation. Also, at least one of the $n^{th}$ dummy data VPTn and the $n^{th}$ virtual encryption key VRKn may be provided to the $n^{th}$ round core 121_$n$, and the $n^{th}$ round core 121_$n$ may perform operations S140 to S144 by using at least one of the $n^{th}$ dummy data VPTn and the $n^{th}$ virtual encryption key VRKn to perform the $n^{th}$ virtual round operation.

Figure 5:
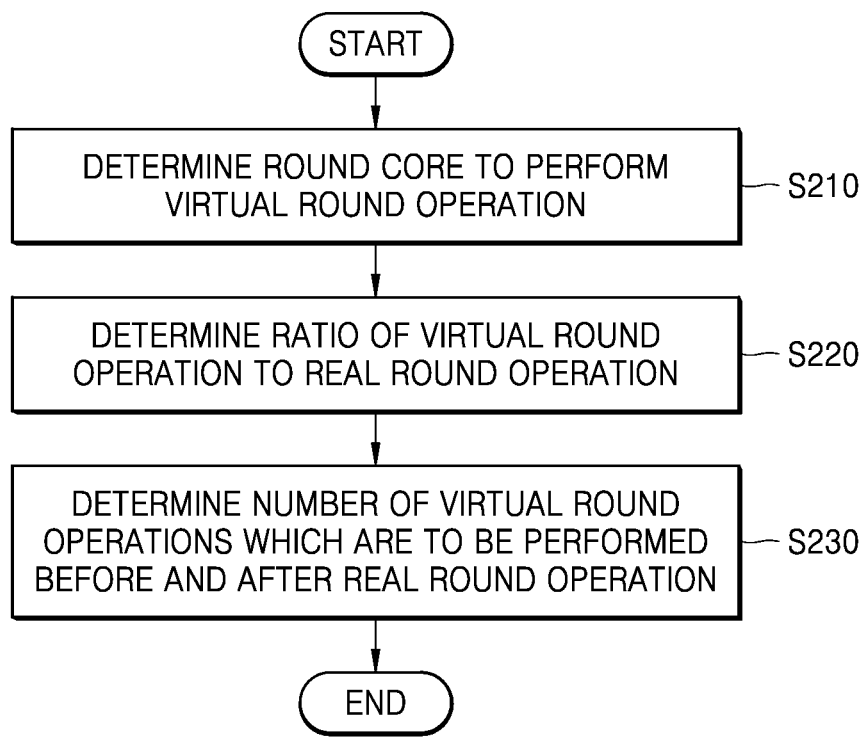
FIG. 5 is a flowchart for describing an operation of an encryption controller of an encryption circuit according to an embodiment.

FIG. 5 is a flowchart for describing an operation of an encryption controller of an encryption circuit according to an embodiment. An encryption operation will be described below with reference to FIG. 5, and a description of the encryption operation may be applied to a decryption operation.

Referring to FIGS. 2, 3, and 5, in operation S210, the encryption controller 110 may determine a round core, by which a virtual round operation is to be performed, from among a plurality of round cores. In an embodiment, the encryption controller 110 may determine a round core, which is vulnerable to an attack of an attacker, as a round core by which the virtual round operation is to be performed. For example, the encryption controller 110 may select the initial round core 121_$i$ to which real data is input or the $n^{th}$ round core 121_$n$, from which encryption data is output, from among the initial round core 121_$i$ and the first to $n^{th}$ round cores 121_1 to 121_$n$. When the first real data PT1 is input to the initial round core 121_$i$, the first to $n^{th}$ round cores 121_1 to 121_$n$ other than the initial round core 121_$i$ may not perform a real round operation, and thus, may be vulnerable to a side-channel analysis attack of the attacker. Also, data may be first input to the $n^{th}$ round core 121_$n$ in a process of performing a decryption operation, and thus, for the same reason as the initial round core 121_$i$, the $n^{th}$ round core 121_$n$ may be vulnerable to the side-channel analysis attack of the attacker. In an embodiment, the round core determined in operation S210 may successively perform a real round operation and a virtual round operation.

In operation S220, the encryption controller 110 may determine a ratio of the virtual round operation to the real round operation which is to be performed by the determined round core. In an embodiment, a sum of the number of real round operations and the number of virtual round operations may be the exponent of 2. That is, the ratio of the virtual round operation to the real round operation may be a value obtained by subtracting one from the exponent of 2. For example, the encryption controller 110 may determine an operation which allows the virtual round operation to be performed three times when the real round operation is performed once.

In operation S230, the encryption controller 110 may determine the number of virtual round operations which are to be performed by the determined round core before or after the real round operation. In an embodiment, by using the random data D_RAN input from the outside, the encryption controller 110 may randomly determine the number of virtual round operations which are to be performed before and after performing a real round operation on each of the first to $k^{th}$ real data PT1 to PTk. For example, according to some embodiments, the encryption controller 110 may set the number of preceding virtual round operations to zero and the number of succeeding virtual round operations to three or may set the number of preceding virtual round operations to one and the number of succeeding virtual round operations to two, with respect to a real round operation. Alternatively, for example, the encryption controller 110 may set the number of preceding virtual round operations to two and the number of succeeding virtual round operations to one or may set the number of preceding virtual round operations to three and the number of succeeding virtual round operations to zero, with respect to a real round operation.

The encryption controller 110 may output the control signal CON_C to the pipelined encryption core 120, based on results of the determinations performed in operations S210 to S230. The pipelined encryption core 120 may perform a real round operation and a virtual round operation, based on the control signal CON_C.

Therefore, in the encryption circuit 100 according to the present embodiment, a virtual round operation may be performed at least once before or after a real round operation, and thus, an attacker may find it difficult to detect a time when the real round operation is performed, thereby enhancing a security level of the encryption circuit 100.

Figure 6:
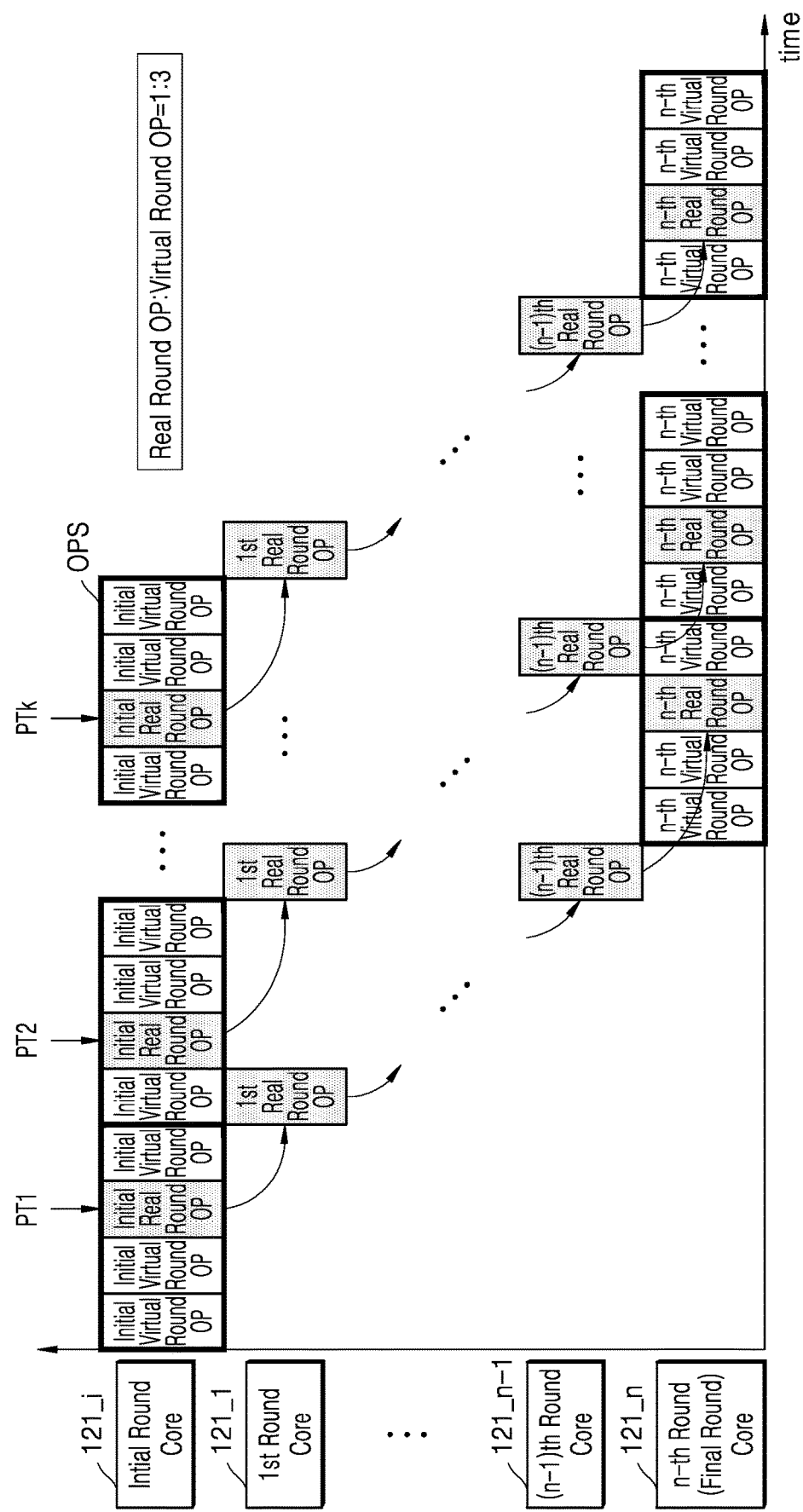
FIGS. 6 to 8 are timing diagrams of an operation of an encryption circuit according to an embodiment.
Figure 7:
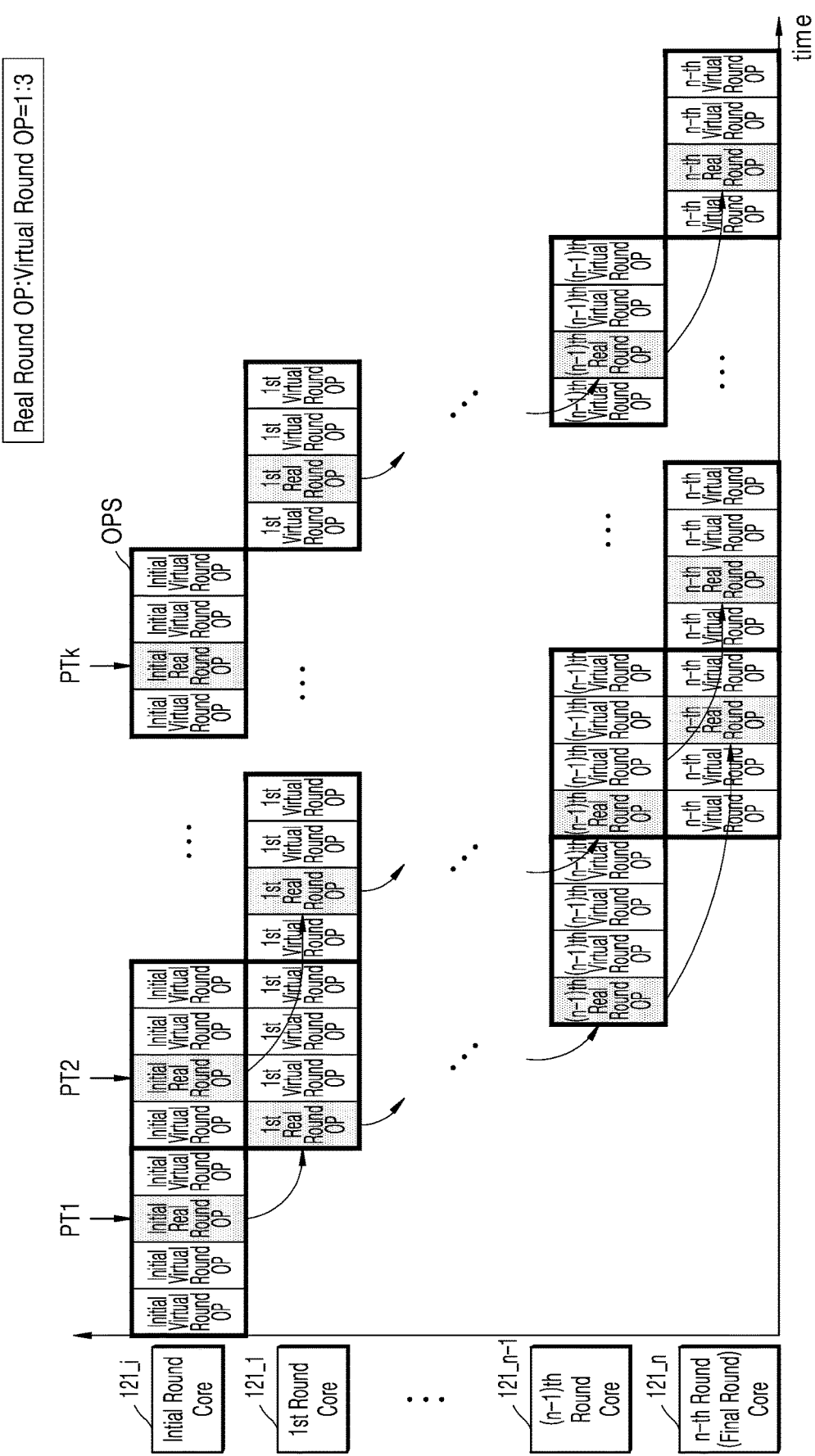
Figure 8:
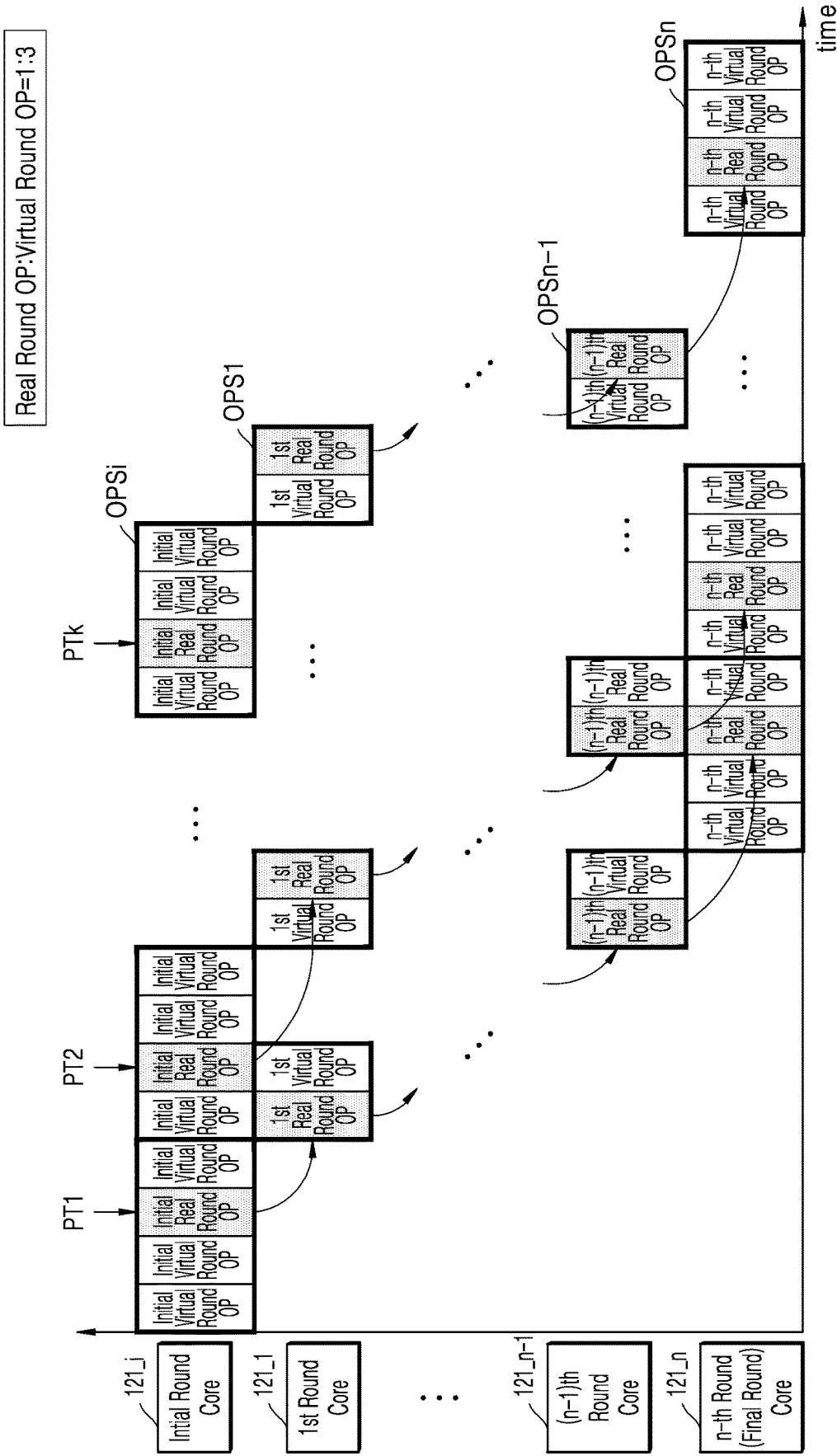

FIGS. 6 to 8 are timing diagrams for describing an operation of an encryption circuit according to an embodiment. FIGS. 6 to 8 are diagrams for describing an operation of a pipelined encryption core based on an operation of the encryption controller 110 of FIG. 5. An encryption operation will be described below with reference to FIGS. 6 to 8, and a description of the encryption operation may be applied to a decryption operation.

Referring to FIG. 6, some of a plurality of round cores 121_$i$ and 121_1 to 121_$n$ may be determined as round cores to successively perform a real round operation and a virtual round operation. Here, the round core 121_$i$ may be an initial round core 121_$i$, and the round cores 121_1 to 121_$n$ may include first to $n^{th}$ round cores 121_1 to 121_$n$. For example, the initial round core 121_$i$ and the $n^{th}$ round core 121_$n$ may be determined. However, the present embodiment is not limited to an example where each of the initial round core 121_$i$ and the $n^{th}$ round core 121_$n$ performs a virtual round operation. In other embodiments, another round core may perform a virtual round operation.

In an embodiment, a ratio of a virtual round operation to a real round operation which is to be performed by the initial round core 121_i may be the same as a ratio of a virtual round operation to a real round operation which is to be performed by the n$^{th}$ round core 121_n. In this case, a ratio of a virtual round operation to a real round operation which is to be performed by each of the initial round core 121_i and the n$^{th}$ round core 121_n may be three. One-time real round operation and three-time virtual round operation may be included in one round operation set OPS.

When the one round operation set OPS performed by the initial round core 121_i on real data (for example, one of first to k$^{th}$ real data PT1 to PTk) ends, the first round core 121_1, which is a next round core, may perform a first real round operation on the real data. When the first round core 121_1 performs the first real round operation immediately after an initial real round operation ends despite the one round operation set OPS being ended by the initial round core 121_i, an attacker may easily detect a time when the initial round core 121_i performs the initial real round operation. Therefore, the first round core 121_1 may be configured to perform the first real round operation on the real data after the one round operation set OPS performed on the real data ends.

In a case where the initial round core 121_i performs an initial real round operation on each of the first to k$^{th}$ real data PT1 to PTk, the number of initial virtual round operations preceding/succeeding the initial real round operation may be randomly set. For example, in the one round operation set OPS, one-time initial real round operation and three-time initial virtual round operation may be randomly performed. Also, in a case where the n$^{th}$ round core 121_n performs an n$^{th}$ real round operation on each of the first to k$^{th}$ real data PT1 to PTk, the number of n$^{th}$ virtual round operations performed before and after the n$^{th}$ real round operation may be randomly set. Accordingly, an attacker may find it difficult to detect a time when each of the initial real round operation and the n$^{th}$ real round operation is performed.

At least two of the plurality of round cores 121_i and 121_1 to 121_n may include a period where the at least two round cores perform a virtual round operation or a real round operation simultaneously. For example, a round operation set OPS operation performed by the initial round core 121_i on the second real data PT2 may be performed in parallel with the first real round operation performed by the first round core 121_1 on the first real data PT1. Also, a round operation set OPS operation performed by the n$^{th}$ round core 121_n on the first real data PT1 may be performed in parallel with the n-1$^{th}$ real round operation performed by the n-1$^{th}$ round core 121_n-1 on the second real data PT2. Accordingly, in the encryption circuit according to the present embodiment, encryption operations may be simultaneously performed on different pieces of data, and thus, an attacker may find it difficult to conduct a side-channel analysis attack.

Referring to FIG. 7, each of a plurality of round cores 121_i and 121_1 to 121_n may successively perform a real round operation and a virtual round operation. Here, the round core 121_i may be an initial round core 121_i, and the round cores 121_1 to 121_n may include first to n$^{th}$ round cores 121_1 to 121_n. In an embodiment, ratios of virtual round operations to real round operations which are to be respectively performed by the plurality of round cores 121_i and 121_1 to 121_n may be the same. For example, a ratio of a virtual round operation to a real round operation may be three. One-time real round operation and three-time virtual round operation may be included in one round operation set OPS.

At least two of the plurality of round cores 121_i and 121_1 to 121_n may include a period where the at least two round cores perform a virtual round operation or a real round operation simultaneously. For example, a round operation set OPS operation performed by the initial round core 121_i on the second real data PT2 may be performed in parallel with a round operation set OPS operation performed by the first round core 121_1 on the first real data PT1. Also, a round operation set OPS operation performed by the n$^{th}$ round core 121_n on the first real data PT1 may be performed in parallel with a round operation set OPS operation performed by the n-1$^{th}$ round core 121_n-1 on the second real data PT2.

Referring to FIG. 8, each of at least some of a plurality of round cores 121_i and 121_1 to 121_n may successively perform a real round operation and a virtual round operation. Here, the round core 121_i may be an initial round core 121_i, and the round cores 121_1 to 121_n may include first to n$^{th}$ round cores 121_1 to 121_n. For example, each of the initial round core 121_i, the first round core 121_1, the n-1$^{th}$ round core 121_n-1, and the n$^{th}$ round core 121_n may successively perform a real round operation and a virtual round operation.

In an embodiment, ratios of virtual round operations to real round operations which are to be respectively performed by the initial round core 121_i, the first round core 121_1, the n-1$^{th}$ round core 121_n-1, and the n$^{th}$ round core 121_n may not be the same. For example, the encryption controller 110 may determine a ratio of a virtual round operation to a real round operation, which is to be performed by a round core expected to be vulnerable to an attack of an attacker, as a high ratio. For example, a ratio of a virtual round operation to a real round operation which is to be performed by each of the initial round core 121_i and the n$^{th}$ round core 121_n may be three, and one-time real round operation and three-time virtual round operation may be included in each of one round operation set OPSi and one round operation set OPSn. On the other hand, a ratio of a virtual round operation to a real round operation which is to be performed by each of the first round core 121_1 and the n-1$^{th}$ round core 121_n-1 may be one, and one-time real round operation and one-time virtual round operation may be included in each of one round operation set OPS1 and one round operation set OPSn-1. In each of the one round operation set OPSi, the one round operation set OPS1, the one round operation set OPSn-1, and the one round operation set OPSn, a real round operation and a virtual round operation may be randomly performed based on a predetermined ratio.

Figure 9:
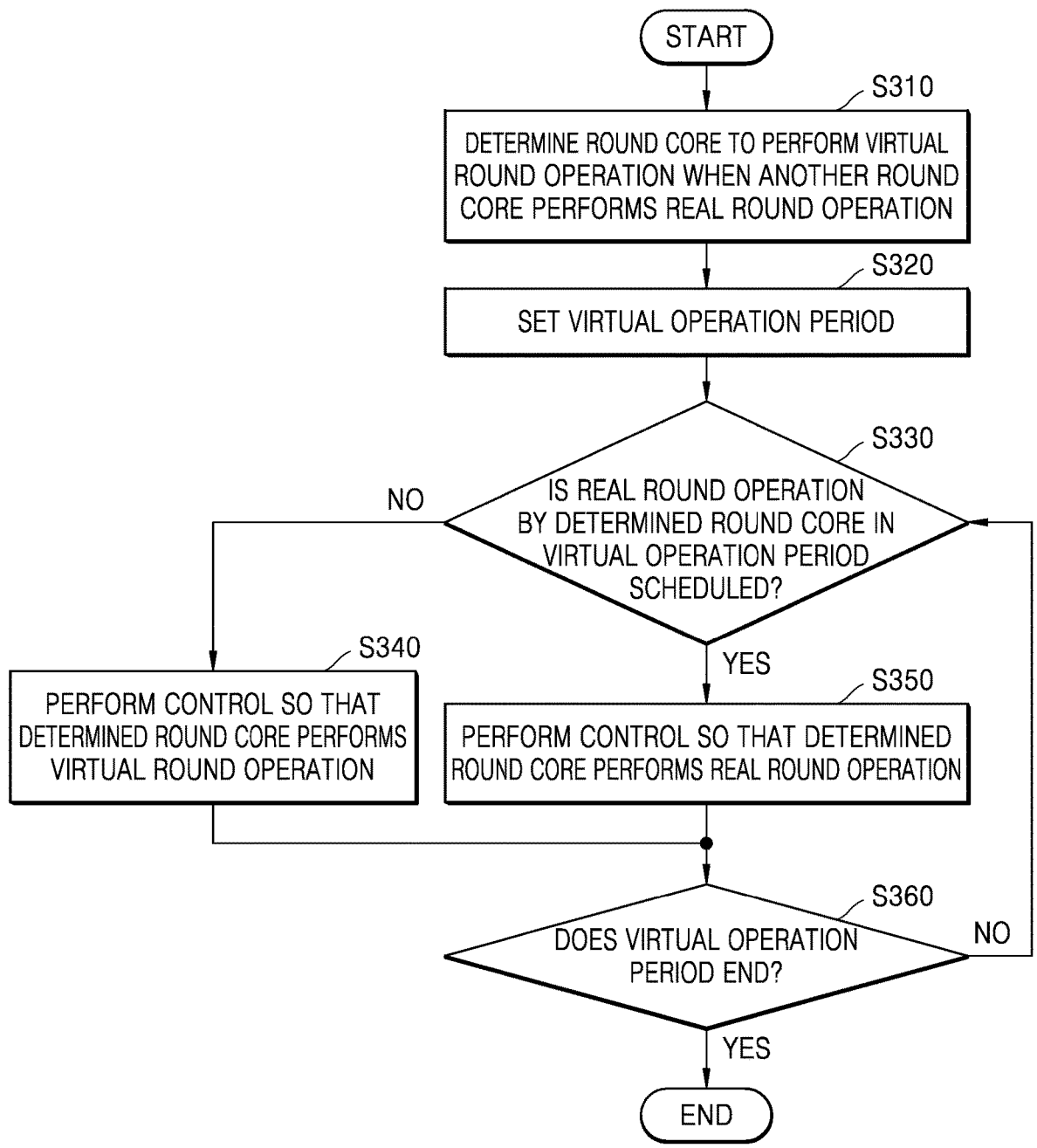
FIG. 9 is a flowchart for describing an operation of an encryption controller of an encryption circuit according to an embodiment.

FIG. 9 is a flowchart for describing an operation of an encryption controller of an encryption circuit according to an embodiment. An encryption operation will be described below with reference to FIG. 9, and a description of the encryption operation may be applied to a decryption operation.

Referring to FIGS. 2, 3, and 9, in operation S310, the encryption controller 110 may determine a round core to perform a virtual round operation when another round core is performing a real round operation. For example, the encryption controller 110 may determine the first round core 121_1 as a round core by which a virtual round operation is to be performed.

In operation S320, the encryption controller 110 may set a virtual operation period where the round core determined in operation S310 performs a virtual round operation. In an embodiment, the encryption controller 110 may set the virtual operation period including a period from a time, when an encryption operation performed on each of the first to $k^{th}$ real data PT1 to PTk starts, to a time when the encryption operation ends. In an embodiment, the encryption controller 110 may set a period, which is vulnerable to a side-channel analysis attack of an attacker, as the virtual operation period. For example, the encryption controller 110 may set a period, where only one real round operation is performed or two real round operations are performed in parallel, as the virtual operation period.

In operation S330, the encryption controller 110 may check whether a real round operation by the round core determined in operation S310 is scheduled. For example, the encryption controller 110 may check whether a real round operation by the first round core 121_1 is scheduled in the virtual operation period which is set in operation S320.

When it is determined that the real round operation by the determined round core is not scheduled in the virtual operation period, in operation S340, the encryption controller 110 may perform control in order for the determined round core to perform a virtual round operation when another round core is performing a real round operation. On the other hand, when it is determined that the real round operation by the determined round core is scheduled, in operation S350, the encryption controller 110 may perform control in order for the determined round core to perform a real round operation.

In operation S360, the encryption controller 110 may check whether a virtual operation period ends. When it is determined that the virtual operation period does not end, the encryption controller 110 may again perform operation S330. On the other hand, when it is determined that the virtual operation period has ended, the encryption controller 110 may end a virtual round operation.

In the encryption circuit 100 according to the present embodiment, a virtual round operation may be performed by a round core, which does not perform an arithmetic operation, other than a round core which is performing a real round operation, and thus, noise may occur. Accordingly, an attacker may find it difficult to conduct a side-channel analysis attack, thereby enhancing a security level of the encryption circuit 100.

Figure 10:
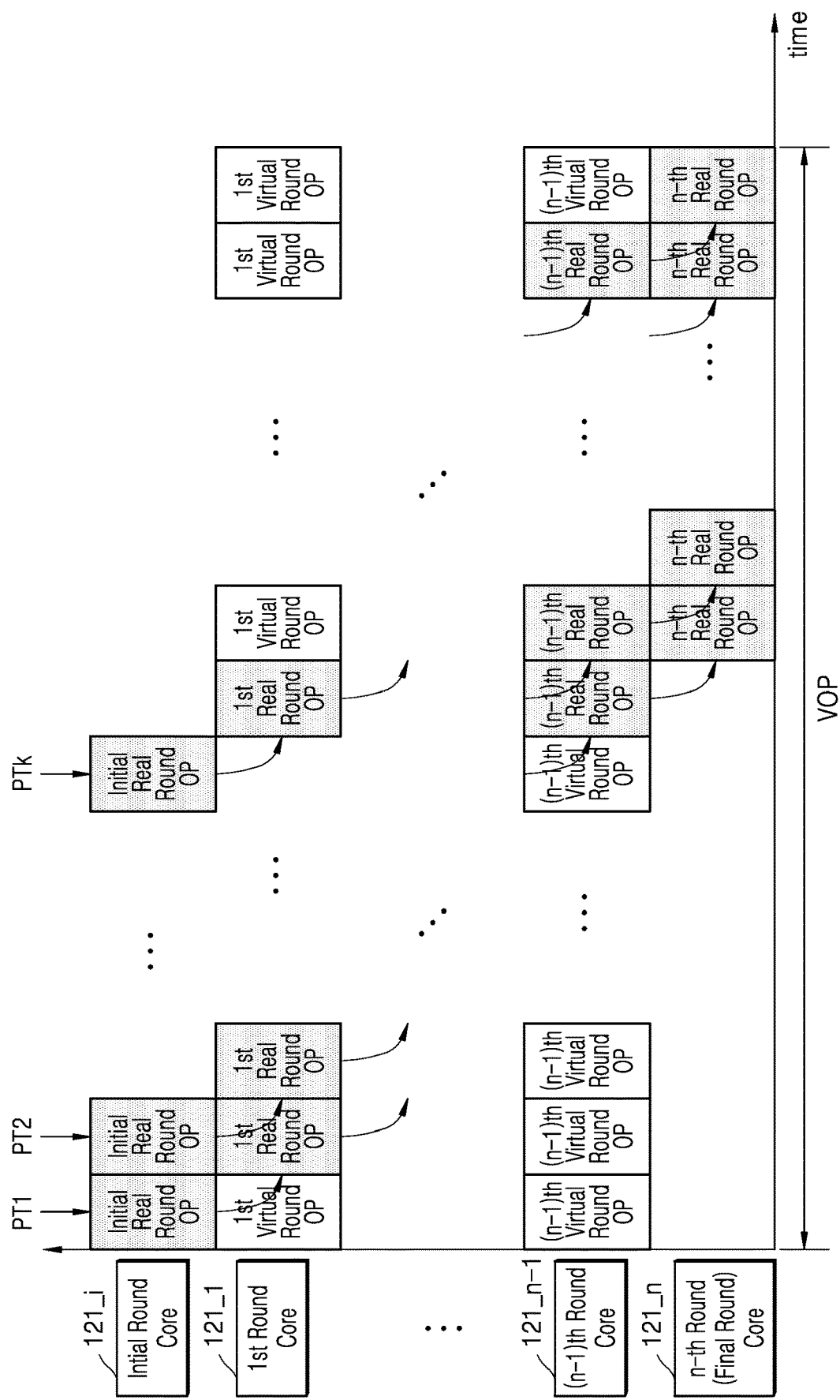
FIGS. 10 to 12 are timing diagrams for describing an operation of an encryption circuit according to an embodiment.
Figure 11:
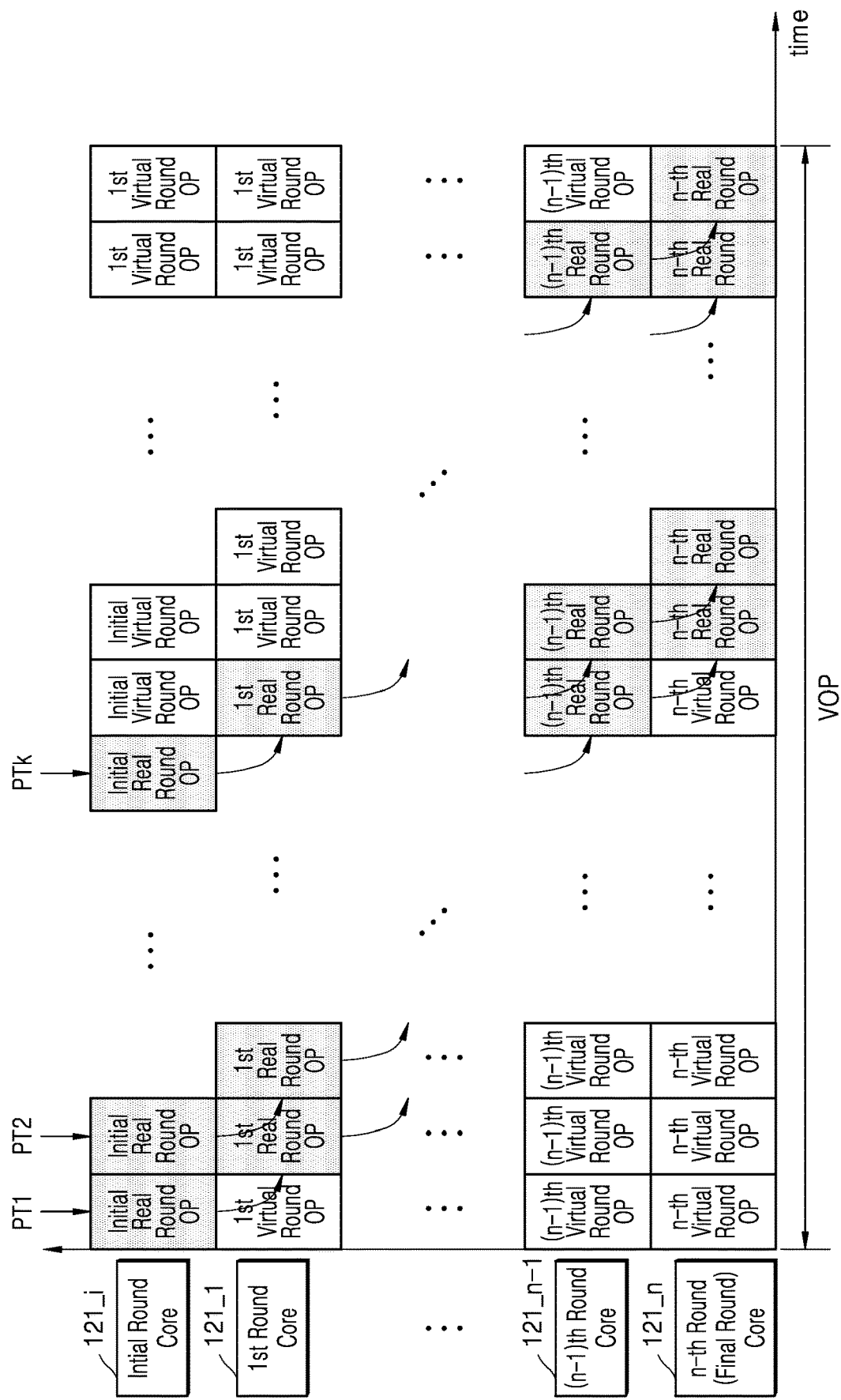
Figure 12:
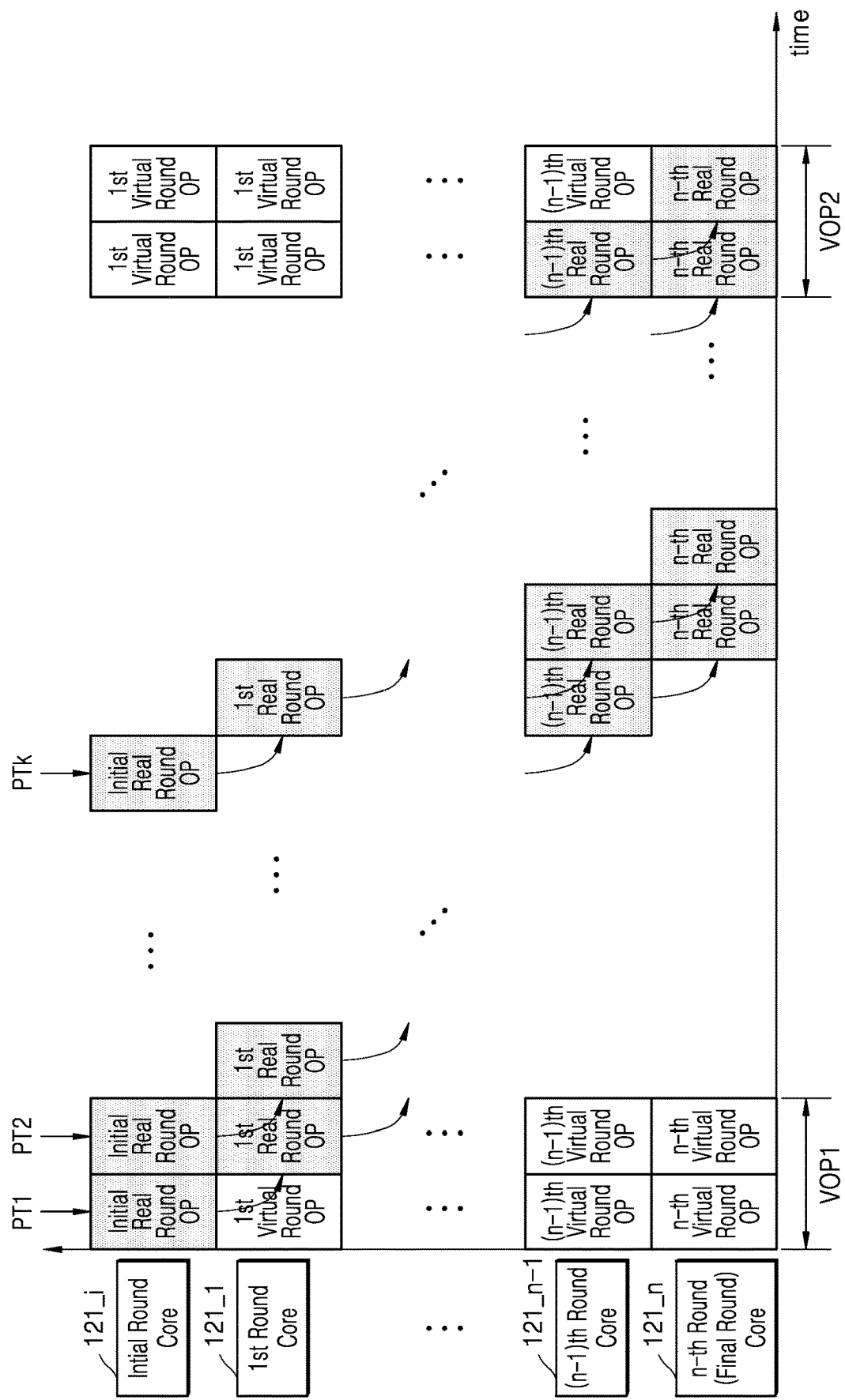

FIGS. 10 to 12 are timing diagrams for describing an operation of an encryption circuit according to an embodiment. FIGS. 10 to 12 are diagrams for describing an operation of a pipelined encryption core based on an operation of the encryption controller 110 of FIG. 9. An encryption operation will be described below with reference to FIGS. 10 to 12, and a description of the encryption operation may be applied to a decryption operation.

Referring to FIG. 10, some of a plurality of round cores 121_i and 121_1 to 121_n may be determined as round cores for performing a virtual round operation when another round core is performing a real round operation. Here, the round core 121_i may be an initial round core 121_i, and the round cores 121_1 to 121_n may include first to $n^{th}$ round cores 121_1 to 121_n. For example, the first round core 121_1 and the n-1$^{th}$ round core 121_n-1 may be determined. In this case, a virtual operation period VOP where a virtual round operation is to be performed by each of the first round core 121_1 and the n-1$^{th}$ round core 121_n-1 may be set as a period from a time, when an encryption operation performed on each of first to $k^{th}$ real data PT1 to PTk starts, to a time when the encryption operation ends.

The first round core 121_1 and the n-1$^{th}$ round core 121_n-1 of the plurality of round cores 121_i and 121_1 to 121_n may respectively perform a first virtual round operation and an n-1$^{th}$ virtual round operation when a first real round operation and an n-1$^{th}$ real round operation are not performed. In the encryption circuit according to the present embodiment, at least two of the plurality of round cores 121_i and 121_1 to 121_n may include a period where the at least two round cores perform a virtual round operation or a real round operation simultaneously. Therefore, in the encryption circuit according to the present embodiment, since a real round operation and a virtual round operation are simultaneously performed, only an initial real round operation may be performed on the first real data PT1 after an encryption operation starts, thereby preventing an attacker from easily conducting a side-channel analysis attack. Also, in the encryption circuit according to the present embodiment, only an $n^{th}$ real round operation may be performed on the $k^{th}$ real data PTk, thereby preventing the attacker from easily conducting the side-channel analysis attack.

Referring to FIG. 11, a plurality of round cores 121_i and 121_1 to 121_n may be determined as round cores for performing a virtual round operation when another round core is performing a real round operation. In this case, a virtual operation period VOP where a virtual round operation is to be performed by each of the plurality of round cores 121_i and 121_1 to 121_n may be set as a period from a time, when an encryption operation performed on each of first to $k^{th}$ real data PT1 to PTk starts, to a time when the encryption operation ends.

Each of the plurality of round cores 121_i and 121_1 to 121_n may perform a virtual round operation when a real round operation is not performed. Therefore, in the encryption circuit according to the present embodiment, since a real round operation and a virtual round operation are simultaneously performed, only an initial real round operation may be performed on the first real data PT1 after an encryption operation starts, thereby preventing an attacker from easily conducting a side-channel analysis attack.

Referring to FIG. 12, some of a plurality of round cores 121_i and 121_1 to 121_n may be determined as round cores for performing a virtual round operation when another round core is performing a real round operation. Here, the round core 121_i may be an initial round core 121_i, and the round cores 121_1 to 121_n may include first to $n^{th}$ round cores 121_1 to 121_n. For example, the first round core 121_1 and the n-1$^{th}$ round core 121_n-1 may be determined.

In this case, a first virtual operation period VOP1 where a virtual round operation is performed may be set as a period where an initial real round operation is performed on first real data PT1, a first real round operation is performed on the first real data PT1, and an initial real round operation is performed on second real data PT2. Also, a second virtual operation period VOP2 where a virtual round operation is performed may be set as a period where an $n^{th}$ real round operation is performed on k-1$^{th}$ real data PTk-1, an n-1$^{th}$ real round operation is performed on the $k^{th}$ real data PTk, and an $n^{th}$ real round operation is performed on the $k^{th}$ real data PTk.

When a virtual round operation is not performed in the first virtual operation period VOP1 and the second virtual operation period VOP2, only one or two real round operations may be performed, and thus, the first virtual operation period VOP1 and the second virtual operation period VOP2 may be vulnerable to an attack. Therefore, a period relatively vulnerable to an attack may be set as a virtual operation period, and a virtual round operation may be additionally performed, thereby protecting the virtual operation period against an attack. The first virtual operation period VOP1 and the second virtual operation period VOP2 may be set as some periods instead of a whole period where an encryption operation is performed on first to $k^{th}$ real data PT1 to PTk, and thus, in a period determined as being vulnerable to an attack of an attacker, the encryption circuit according to the present embodiment may allow noise to occur and may reduce power consumption.

Figure 13:
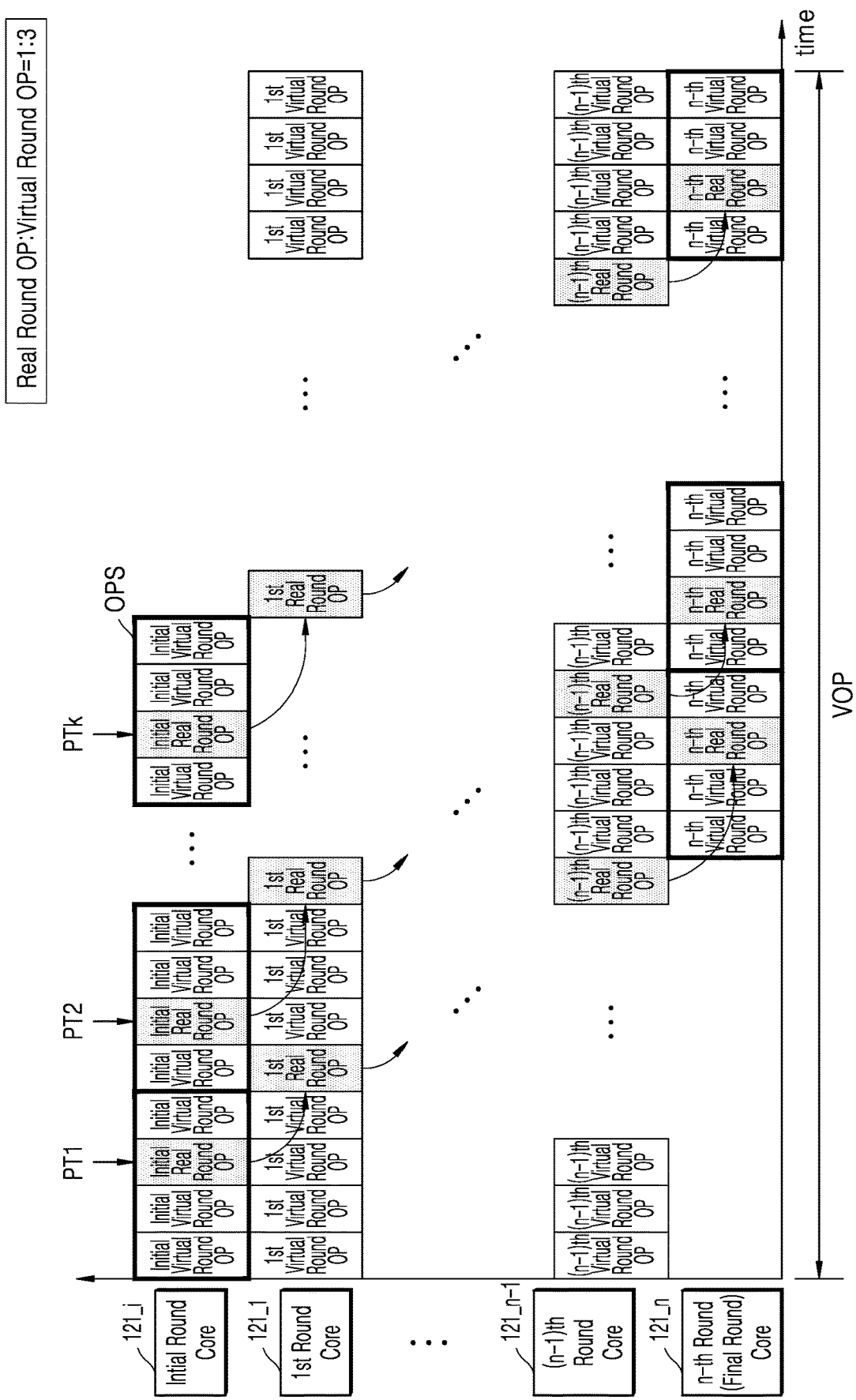
FIG. 13 is a timing diagram for describing an operation of an encryption circuit according to an embodiment.

FIG. 13 is a timing diagram for describing an operation of an encryption circuit according to an embodiment. FIG. 13 is a diagram for describing an operation of a pipelined encryption core based on an operation of the encryption controller 110 of FIGS. 5 and 9. An encryption operation will be described below with reference to FIG. 13, and a description of the encryption operation may be applied to a decryption operation.

Referring to FIG. 13, some of a plurality of round cores 121_*i* and 121_1 to 121_*n* may be determined as round cores to successively perform a real round operation and a virtual round operation. Here, the round core 121_*i* may be an initial round core 121_*i*, and the round cores 121_1 to 121_*n* may include first to $n^{th}$ round cores 121_1 to 121_*n*. For example, the initial round core 121_*i* and the $n^{th}$ round core 121_*n* may be determined. However, the present embodiment is not limited thereto, and the plurality of round cores 121_*i* and 121_1 to 121_*n* may be determined as round cores to successively perform a real round operation and a virtual round operation.

In an embodiment, a ratio of a virtual round operation to a real round operation which is to be performed by the initial round core 121_*i* may be the same as a ratio of a virtual round operation to a real round operation which is to be performed by the $n^{th}$ round core 121_*n*. For example, a ratio of a virtual round operation to a real round operation which is to be performed by each of the initial round core 121_*i* and the $n^{th}$ round core 121_*n* may be three. One-time real round operation and three-time virtual round operation may be included in one round operation set OPS. In other embodiments, a ratio of a virtual round operation to a real round operation which is to be performed by the initial round core 121_*i* may differ from a ratio of a virtual round operation to a real round operation which is to be performed by the $n^{th}$ round core 121_*n*.

In a case where the initial round core 121_*i* performs an initial real round operation on each of first to $k^{th}$ real data PT1 to PTk, the number of initial virtual round operations performed before and after the initial real round operation may be randomly set. That is, in the one round operation set OPS, one-time initial real round operation and three-time initial virtual round operation may be randomly performed. Also, in the one round operation set OPS, one-time $n^{th}$ real round operation and three-time $n^{th}$ virtual round operation may be randomly performed. Accordingly, an attacker may find it difficult to detect a time when each of the initial real round operation and the $n^{th}$ real round operation is performed.

At least some of the plurality of round cores 121_*i* and 121_1 to 121_*n* may be determined as round cores for performing a virtual round operation when another round core is performing a real round operation. For example, the first round core 121_1 and the $n-1^{th}$ round core 121_*n*–1 may be determined. In this case, a virtual operation period VOP where a virtual round operation is to be performed by each of the first round core 121_1 and the $n-1^{th}$ round core 121_*n*–1 may include at least some of periods from a time, when an encryption operation performed on each of the first to $k^{th}$ real data PT1 to PTk starts, to a time when the encryption operation ends. For example, the virtual operation period VOP may be a whole period where the encryption operation is performed on each of the first to $k^{th}$ real data PT1 to PTk.

The first round core 121_1 and the $n-1^{th}$ round core 121_*n*–1 of the plurality of round cores 121_*i* and 121_1 to 121_*n* may respectively perform a first virtual round operation and an $n-1^{th}$ virtual round operation when a first real round operation and an $n-1^{th}$ real round operation are not performed. Therefore, in the encryption circuit according to the present embodiment, since a real round operation and a virtual round operation are simultaneously performed, only an initial real round operation may be performed on the first real data PT1 after an encryption operation starts, thereby preventing an attacker from easily conducting a side-channel analysis attack. Also, in the encryption circuit according to the present embodiment, only an $n^{th}$ real round operation may be performed on the $k^{th}$ real data PTk, thereby preventing the attacker from easily conducting the side-channel analysis attack.

While the inventive concept has been particularly shown and described with reference to embodiments thereof, it will be understood that various changes in form and details may be made therein without departing from the spirit and scope of the following claims.

What is claimed is:

1. An encryption circuit comprising:
   a pipelined encryption core comprising a plurality of round cores configured to perform a sequence of real round operations on each of pieces of input data sequentially input thereto, the pipelined encryption core outputting encryption data through an encryption operation using the real round operations; and
   an encryption controller configured to perform control so that at least one of the plurality of round cores performs at least one virtual round operation in addition to a real round operation;
   wherein the encryption controller is configured to perform control so that the virtual round operation of the at least one round core is performed concurrently with a real round operation being performed by at least one other round core of the plurality of round cores;
   wherein the real round operation performed by the at least one other round core further encrypts a piece of input data that was previously encrypted by the round core performing the virtual round operation; and
   wherein the virtual round operation increases security of the encryption circuit by generating dummy encryption data during at least one portion of a first time interval having a first duration that is multiple times a duration of a time interval associated with the real round operation.

2. The encryption circuit of claim 1, wherein the encryption controller is configured to
   determine the at least one round core as a round core, by which the virtual round operation is to be performed, from among the plurality of round cores,
   determine a ratio of the virtual round operation to the real round operation which is to be performed by the determined round core, and
   perform control so that the determined at least one round core performs the real round operation and the virtual round operation, based on the ratio, which is an integer greater than one.

3. The encryption circuit of claim 2, wherein the encryption controller is configured to
   randomly determine number of virtual round operations which are to be performed before the real round operation and number of virtual round operations which are to be performed after the real round operation, based on the ratio, and perform control so that the determined round core performs the real round operation and the virtual round operation, based on the determined numbers.

4. The encryption circuit of claim 2, wherein the encryption controller is configured to determine an initial round core, to which first input data of the pieces of input data is input, as a round core to perform the virtual round core from among the plurality of round cores.

5. The encryption circuit of claim 2, wherein the encryption controller determines a final round core, from which the encryption data is output, as a round core to perform the virtual round core from among the plurality of round cores.

6. The encryption circuit of claim 2, wherein the encryption controller is configured to determine the plurality of round cores as round cores to perform the virtual round core.

7. The encryption circuit of claim 2, wherein the encryption controller is configured to determine different round cores as round cores to perform the virtual round core, and ratios of the virtual round operation to the real round operation respectively performed by the different round cores differ.

8. The encryption circuit of claim 1, wherein the encryption controller is configured to determine a round core, by which the virtual round operation is to be performed, from among the plurality of round cores when another round core performs the real round operation, determine a virtual operation period where the virtual round operation is to be performed by the determined round core, and perform control so that the determined round core additionally performs the virtual round operation during the virtual operation period.

9. The encryption circuit of claim 8, wherein the encryption controller is configured to set a period, where the pipelined encryption core performs the encryption operation, as the virtual operation period.

10. The encryption circuit of claim 8, wherein the encryption controller is configured to set the virtual operation period comprising a period where an initial round core, to which first input data of the pieces of input data is input, of the plurality of round cores performs an operation on the first input data of the pieces of input data.

11. The encryption circuit of claim 8, wherein the encryption controller is configured to set the virtual operation period comprising a period where a final round core, from which the encryption data is output, of the plurality of round cores performs an operation on finally input data of the pieces of input data.

12. The encryption circuit of claim 1, wherein the encryption controller is configured to determine a first round core to successively perform the real round operation and the virtual round operation from among the plurality of round cores, determine a second round core to perform the virtual round operation from among the plurality of round cores when another round core performs the real round operation, and perform control so that the first round core and the second round core perform the real round operation and the virtual round operation.

13. An encryption circuit, comprising:

a pipelined encryption core having a plurality of round cores therein including a pipelined arrangement of an initial round core followed by first through n-th round cores, where n is an integer greater than one, said pipelined encryption core configured to perform a pipelined-sequence of real round operations on each of a plurality of pieces of input data received therein and generate real encryption data from the input data using an encryption operation comprising the pipelined-sequence of real round operations; and an encryption controller coupled to said pipelined encryption core, said encryption controller configured to control said pipelined encryption core so that at least one of the plurality of round cores performs at least one virtual round operation that generates dummy encryption data as part of the encryption operation;

wherein said performing the pipelined-sequence of real round operations on each of a plurality of pieces of input data comprises sequentially performing at least n real round operations on each of the plurality of pieces of input data;

wherein the initial round core performs at least one initial virtual round operation during a first time interval when the first round core performs a real round operation on a first real encryption result, which was previously generated by the initial round core performing a real round operation on a corresponding first piece of the input data; and wherein each of the at least one virtual round operation increases security of the encryption circuit by generating dummy encryption data during at least one portion of the first time interval having a first duration that is multiple times a duration of a time interval associated with the real round operation.

14. The encryption circuit of claim 13, wherein the initial round core generates a plurality of pieces of dummy encryption data by performing a corresponding plurality of initial virtual round operations during the first time interval.

15. The encryption circuit of claim 13, wherein the dummy encryption data is generated using at least one of: (i) dummy data, and (ii) a dummy encryption key.

16. The encryption circuit of claim 13, wherein the pipelined arrangement of round cores are separated from each other by respective registers.

17. The encryption circuit of claim 13, wherein said pipelined encryption core comprises a key scheduler configured to generate real and virtual keys, which are used by the pipelined arrangement of round cores when performing the real and virtual round operations that generate real encryption data and dummy encryption data, respectively.

* * * * *